United States Patent

[11] 3,627,887

[72] Inventor Charles Lewis
Parchment, Mich.
[21] Appl. No. 867,418
[22] Filed Oct. 17, 1969
[45] Patented Dec. 14, 1971
[73] Assignee The Upjohn Company
Kalamazoo, Mich.
Continuation of application Ser. No. 651,135, July 5, 1967, now abandoned. This application Oct. 17, 1969, Ser. No. 867,418

[54] PROCESS FOR TREATING MALARIA
16 Claims, No Drawings

[52] U.S. Cl. .................................. 424/181, 424/184, 424/200
[51] Int. Cl. ....................................... A61k 21/00
[50] Field of Search ............................ 424/181

[56] References Cited
UNITED STATES PATENTS
3,150,042 9/1964 Bloss et al. .................. 424/274

OTHER REFERENCES

Dorland, Medical Dictionary, W. B. Saunders Co., 18 th Edition, 1938, page 330

Derwent Farmdoc #22620, Abstracting Belgium Patent 676,202, Published 8–8–66, pages 435–441

Primary Examiner—Jerome D. Goldberg
Attorneys—John J. Killinger, Eugene O. Retter and Joseph K. Andonian ABSTRACT: A process for treating malaria by the systemic administration to a subject hosting a malarial parasite of a compound of the formula

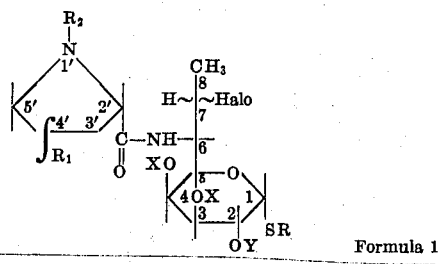

Formula 1 where Halo is chlorine or bromine, R is an alkyl radical of from one to four carbon atoms inclusive, $R_1$ is an alkyl radical of from two to eight carbon atoms, inclusive, $R_2$ is hydrogen or alkyl radical of from one to eight carbon atoms, inclusive, X is hydrogen or trimethylsilyl, and Y is hydrogen, trimethylsilyl, phosphate or hydrocarbon acyl radical of up to 18 carbon atoms and provided that when Y is phosphate or acyl then X is hydrogen.

PROCESS FOR TREATING MALARIA

This application is a continuation of application Ser. No. 651,135, now abandoned.

CROSS REFERENCES TO RELATED APPLICATIONS

The following applications and patents disclose the preparation of the compounds of the formula 1.

The 7-halo lincomycin compounds of the formula 1 where X and Y are hydrogen can be prepared by methods disclosed in copending U.S. Application Ser. No. 498,989 filed Oct. 20, 1965 now abandoned French Pat. No. 1,467,501 issued Dec. 19, 1966; Spanish Pat. No. 323,064 issued Mar. 30, 1966; Belgian Pat. No. 676,202 issued Aug. 8, 1966 and Iranian Pat. No. 6073 issued May 12, 1966.

The 7-halo lincomycin compounds of the formula 1 wherein X and y are hydrogen or trimethylsilyl can be prepared as disclosed in copending U.S. application Ser. No. 576,238 filed Aug. 31, 1966 issued Dec. 24, 1968 as U.S. Pat. No. 3,418,414.

The compounds of the formula 1 wherein X is hydrogen and Y is phosphate can be prepared by methods disclosed in copending U.S. application Ser. No. 602,116 filed Dec. 16, 1966 issued Dec. 30, 1969 as U.S. Pat. No. 3,487,068.

The compounds of the formula 1 wherein $R_2$ is hydrogen can be prepared by methods disclosed in copending U.S. application Ser. No. 587,662 filed Oct. 19, 1966 now abandoned.

The compounds of the formula 1 wherein X is hydrogen and Y is an acyl radical of up to 12 carbon atoms can be prepared as disclosed in copending U.S. Application Ser. No. 359,425 filed Apr. 13, 1964; issued June 20, 1967 as U.S. Pat. No. 3,326,891 Argentine Pat. No. 152,050, Nov. 14, 1966; Union of South Africa Pat. 65/1079, May 11, 1966 and Spanish Pat. No. 311,422, May 14, 1965.

The compounds of the formula 1 wherein X is hydrogen and Y is an acyl radical of up to 18 carbon atoms can be prepared by methods disclosed in copending U.S. application Ser. No. 637,358 filed May 10, 1967 now abandoned.

BRIEF SUMMARY OF INVENTION

This invention relates to the prophylactic and therapeutic treatment of subjects hosting a malarial parasite by the systemic administration of a compound of the formula 1.

DETAILED DESCRIPTION

It has been found in accordance with the present invention that the systemic administration of a compound of the formula 1 to a subject hosting a malarial parasite provides effective suppressive treatment of the malarial disease. The subject can be animal, e.g., mice infected with *P. berghei;* birds, e.g., ducks infected with *P. lophurae* and chicks infected with *P. qallinaceum,* and mammals such as primates, e.g., monkeys infected with *P. cynomolqi,* and humans infected with *P. falciporum, P. vivax,* and *P. malariae.*

The compounds of the formula 1 can be administered systemically by the oral and parenteral routes preferably in association with a pharmaceutical carrier or in the case of animals (orally) in association with the animals feed. Additionally, the compounds of the formula 1 can be mixed with table salt for administration to humans for use in a program of mass drug administration in developing countries.

Advantageously, the compounds of the formula 1 do not exhibit cross-resistance when used against drug resistant, e.g., chloroquine or dimethyldiphenylsulfone (DDS), strains of malarial parasites.

The process of the present invention is accomplished by oral or parenteral administration of pharmaceutical compositions preferably presented for administration to humans and animals in unit dosage forms, such as tablets, capsules, pills, powders, granules, sterile parenteral solutions or suspensions, and oral solutions or suspensions, and oil-water emulsions containing suitable quantities of a compound of the formula 1 in the form of the free base, or its pharmacologically acceptable salts.

For oral administration, either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings such materials including a number of polymeric acids or mixture of polymeric acids with such materials as shellac, cetyl alcohol, cellulose acetate phthalate, styrene maleic acid copolymer and the like. Alternatively, the two component system can be utilized for preparing tablets containing two or more incompatible active ingredients. Wafers are prepared in the same manner as tablets, differing only in shape and the inclusion of sucrose or other sweetener and flavor. In their simplest embodiment, capsules, like tablets, are prepared by mixing the compound of the formulation with an inert pharmaceutical diluent and filling the mixture into a hard gelatin capsule of appropriate size. In another embodiment, capsules are prepared by filling hard gelatin capsules with polymeric acid coated beads containing the compound of the formula 1. Soft gelatin capsules are prepared by machine encapsulation of a slurry of the compound of the formula 1 with an acceptable vegetable oil, light liquid petrolatum or other inert oil.

Fluid unit dosage forms for oral administration such as syrups, elixirs, and suspensions can be prepared. The water-soluble forms of the compound of the formula 1 can be dissolved in an aqueous vehicle together with sugar, aromatic flavoring agents and preservatives to form a syrup. An elixir is prepared by using a hydroalcoholic (ethanol) vehicle with suitable sweeteners such as sucrose together with an aromatic favoring agent. Suspensions can be prepared of the insoluble forms with a syrup vehicle with the aid of a suspending agent such as acacia, tragacanth, methylcellulose and the like.

For parenteral administration, fluid unit dosage forms are prepared utilizing a compound of the formula 1 and a sterile vehicle, water being preferred. The compound, depending on the form and concentration used, can be either suspended or dissolved in the vehicle. In preparing solutions, a water-soluble form of the compound of formula 1 can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. For sustained action, an intramuscular suspension is prepared with an insoluble form such as the trimethylsilyl ether or the pamoate salt. Advantageously, a surfacant or wetting agent is included in the composition to facilitate uniform distribution of the compound.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, troches, suppositories, powder packets, granules, wafers, cachets, teaspoonfuls, tablespoonfuls, dropperfuls, ampuls, vials, segregated multiples of any of the foregoing, and other forms as herein described.

In addition to the administration of a compound of the formula 1 as the principal active ingredient of compositions for the treatment of malaria, the said compound can be included with other antimalarials to obtain advantageous combinations of properties. Such combinations include a compound of the formula 1 with quinine; with dimethyldiphenylsulfone; the 4-aminoquinolines, for example: amodiaquine, amopyroquine, cycloquine, chloroquine, hydroxychloroquine, oxychloroquine, and sontoquine; the 9-aminoacridines, for example: quinacrine, azacrine, and aminoacrichine; the 8-aminoquinolines, for example: pamaquine, fourneau 710, certuna, pentaquine, isopentaquine, primaquine, and quinocide; the biguanides, for example: proguanil, chloroproguanil, and chloroazine; the diaminopyrimidines, for example: pyrimethamine; the long-acting sulfonamides, for example: sulfadiazine, sulphormethoxine, sulfadimethoxine, and sulfamethoxypyridazino.

The dosage of a compound of the formula 1 for treatment depends on route and frequency of administration; the age, weight, and condition of the patient; and the particular malaria parasite to be treated. A daily dosage schedule of from about 0.5 to 200 mg./kg. parenterally and from 1 to 300 mg./kg. orally embraces the effective range for treatment. The preferred dosage range is from 5 to 50 mg./kg. parenterally and 25 to 100 mg./kg. orally. The oral suppressive dose can be as low as one-tenth the above treatment dose.

The compound of the formula 1 is compounded with a suitable pharmaceutical carrier in unit dosage form for convenient and effective administration. In the preferred embodiments of this invention, the dosage units contain 10, 25, 50, 100, 250, and 500 mg. amounts of a compound of formula 1 for systemic treatment; and 5 to 65 percent w./v. for parenteral treatment. The dosage of compositions containing the compound of the formula 1 and one or more other active ingredients is to be determined with reference to the usual dosage of each such ingredient.

The following examples are illustrative of the best mode contemplated by the inventors for carrying out their invention and are not to be construed as limiting.

EXAMPLE 1 Capsules

One thousand two-piece hard gelatin capsules for oral use, each containing 250 mg. of 7(S)-chloro-7-deoxy lincomycin hydrochloride are prepared from the following types and amounts of materials:

| | |
|---|---|
| 7(S)-chloro-7-deoxy lincomycin hydrochloride | 250 gm. |
| Corn starch | 100 gm. |
| Talc | 75 gm. |
| Magnesium stearate | 25 gm. |

The materials are thoroughly mixed and then encapsulated in the usual manner.

The foregoing capsules are useful for the treatment of malaria in adult humans by the oral administration of one capsule every 6 hours.

Using the procedure above, capsules are similarly prepared containing 7-chloro-7-deoxy lincomycin hydrochloride in 10, 25, 50, 100, and 500 mg. amounts by substituting 10, 25, 50, 100, and 500 gm. of 7-chloro-7-deoxy lincomycin hydrochloride for the 250 gm. used above.

EXAMPLE 2 Capsules

One thousand two-piece hard gelating capsules for oral use, each containing 200 mg. of 7(S)-chloro-7-deoxy lincomycin hydrochloride and 200 mg. of hydroxychloroquine sulfate, are prepared from the following types and amounts of ingredients:

| | |
|---|---|
| 7(S)-chloro-7-deoxy lincomycin hydrochloride | 200 gm. |
| Hydroxychloroquine sulfate | 200 gm. |
| Talc | 75 gm. |
| Magnesium stearate | 25 gm. |

The ingredients are thoroughly mixed and then encapsulated in the usual manner.

The foregoing capsules are useful to prevent recurrent attacks of *P. vivax*, in adult humans by the oral administration of 1 capsule weekly.

EXAMPLE 3 Tablets

One thousand tablets for oral use, each containing 500 mg. of 7(S)-chloro-7-deoxy lincomycin hydrochloride are prepared from the following types and amounts of materials:

| | |
|---|---|
| 7(S)-chloro-7-deoxy lincomycin hydrochloride | 500 gm. |
| Lactose | 125 gm. |
| Corn starch | 65 gm. |
| Magnesium stearate | 25 gm. |
| Light liquid petrolatum | 3 gm. |

The ingredients are thoroughly mixed and slugged. The slugs are broken down by forcing through a number 16 screen. The resulting granules are then compressed into tablets, each tablet containing 500 mg. of 7(S)-chloro-7-deoxy lincomycin hydrochloride.

The foregoing tablets are useful for treatment of malarial infections in adult humans by oral administration of one tablet three times a day.

Using the above procedure, except for reducing the amount of 7(S)-chloro-7-deoxy lincomycin hydrochloride to 250 gm., tablets containing 250 mg. of 7(S)-chloro-7-deoxy lincomycin hydrochloride are prepared.

EXAMPLE 4 Tablets

One thousand oral tablets, each containing 125 mg. of 7(S)-chloro-7-deoxy lincomycin hydrochloride and 325 mg. of quinine sulfate, are prepared from the following types and amounts of materials:

| | |
|---|---|
| 7(S)-chloro-7-deoxy lincomycin hydrochloride | 125 gm. |
| Quinine sulfate | 325 gm. |
| Lactose | 50 gm. |
| Corn starch | 50 gm. |
| Calcium stearate | 25 gm. |
| Light liquid petrolatum | 5 gm. |

The ingredients are thoroughly mixed ans slugged. The slugs are broken down by forcing through a number 16 screen. The resulting granules are then compressed into tablets, each containing 125 mg. of 7(S)-chloro-7-deoxy lincomycin hydrochloride and a 325 mg. of quinine sulfate.

The foregoing tablets are useful for treatment of malaria by the oral administration of two tablets every 8 hours for 7 days then one tablet three times a day for 7 days.

EXAMPLE 5 Oral syrup

One thousand cc. of an aqueous suspension for oral use, containing in each 10 cc. dose 25 mg. of pyrimethamine, 250 mg. of 7(S)-chloro-7-deoxy lincomycin hydrochloride and 500 mg. of sulfadiazine is prepared from the following types and amounts of ingredients:

| | | |
|---|---|---|
| 7(S)-chloro-7-deoxy lincomycin hydrochloride | 25 | gm. |
| Pyrimethamine | 2.5 | gm. |
| Sulfadiazine | 50 | gm. |
| Citric acid | 2 | gm. |
| Benzoic acid | 1 | gm. |
| Sucrose | 700 | gm. |
| Tragacanth | 5 | gm. |
| Lemon oil | 2 | cc. |
| Deionized water, q.s. | 1000 | cc. |

The citric acid, benzoic acid, sucrose, tragacanth, and lemon oil are dispersed in sufficient water to make 850 cc. of solution. The 7(S)-chloro-7-deoxy lincomycin hydrochloride pyrimethamine and sulfadiazine are stirred into the syrup until uniformly distributed. Sufficient water is added to make 1000 cc.

The composition so prepared is useful in the prophylactic treatment of malaria in adult humans at a dose of 1 tablespoonful (10 cc.) weekly.

EXAMPLE 6 Parenteral solution

A sterile aqueous solution for intramuscular use, containing 200 mg. of 7(S)-chloro-7-deoxy lincomycin hydrochloride in 1 cc. is prepared from the following types and amounts of materials:

7(S)-chloro-7-deoxy

| | | |
|---|---|---|
| lincomycin hydrochloride | 200 | gm. |
| Lidocaine hydrochloride | 4 | gm. |
| Methylparaben | 2.5 | gm. |
| Propylparaben | 0.17 | gm. |
| Water for injection, q.s. | 1000 | cc. |

The ingredients are dissolved in the water and the solution sterilized by filtration. The sterile solution is filled into vials and the vials sealed.

EXAMPLE 7 Parenteral preparation

A sterile aqueous composition for intramuscular use, containing in 1 cc. 200 mg. of the tris(trimethylsilyl)ether of 7(S)-chloro-7-deoxy lincomycin is prepared from the following types and amounts of ingredients:

| | | |
|---|---|---|
| Tris(trimethylsilyl)ether of 7(S)-chloro-7-deoxy lincomycin | 200 | gm. |
| Lactose | 50 | gm. |
| Water for injection, q.s. | 1000 | cc. |

The silyl ether of 7(S)-chloro-7-deoxy lincomycin and lactose are dispersed in the water and sterilized. The sterile composition, in the amount of 2 cc., is filled aseptically into sterile vials.

EXAMPLE 8

Following the procedure of the preceding examples 1 to 7, inclusive, but substituting for the halo-lincomycin compound of the examples an equivalent amount each of 7(S)-chloro-7-deoxy-1'-N-demethyl lincomycin, the 4'-pentyl analog of 7(S)-chloro-7-deoxy-1'-N-demethyl lincomycin, the 4'-pentyl analog of 7(S)-chloro-7-deoxy-lincomycin, the 4'-butyl-1'-ethyl analog of 7(S)-chloro-7-deoxy-lincomycin, the 2-0-phosphate ester of the 1'-N-ethyl analog of 7(S)-chloro-7-deoxy-lincomycin, the 2-0-phosphate ester of 7(S)-chloro-7-deoxy-lincomycin, the 2-0-phosphate ester of 7(S)-chloro-7-deoxy-lincomycin, and the 2-0-palmitate ester of 7(S)-chloro-7-deoxy-lincomycin, there can be similarly prepared compositions useful in the treatment of malaria.

I claim:

1. A process for treating malaria comprising the administration of an effective amount of a compound having the formula:

Formula 1

Wherein Halo is chlorine or bromine, R is alkyl of from one to four carbon atoms, inclusive, $R_1$ is alkyl of from two to eight carbon atoms, inclusive, and $R_2$ is hydrogen or alkyl of from one to eight carbon atoms, inclusive, X is hydrogen or trimethylsilyl and Y is hydrogen, trimethylsilyl, phosphate or hydrocarbon acyl of from two to 18 carbon atoms, and provided that when Y is phosphate or acyl then X is hydrogen, including the free base form or pharmacologically acceptable acid addition salts to a mammal hosting a malarial parasite.

2. The process of claim 1 wherein from about 0.5 to about 300 mg. of compound per kg. of host body weight is administered daily in association with a pharmaceutical carrier.

3. The process of claim 1 wherein from about 0.5 to about 200 mg. of compound per kg. of host body weight is parenterally administered daily in association with a sterile pharmaceutical carrier.

4. The process of claim 1 wherein from about 1 to about 300 mg. of compound per kg. of host body weight is orally administered daily in association with a pharmaceutical carrier.

5. A process for treating malaria comprising the administration of an effective amount of 7(S)-chloro-7-deoxy-lincomycin to a mammal hosting a malarial parasite.

6. The process of claim 5 wherein from about 0.5 to about 300 mg. of 7(S)-chloro-7-deoxy-lincomycin per kg. of host body weight is administered daily in association with a pharmaceutical carrier.

7. The process of claim 5 wherein from about 0.5 to about 200 mg. of 7(S)-chloro-7-deoxy-lincomycin per kg. of host body weight is parenterally administered daily in association with a sterile pharmaceutical carrier.

8. The process of claim 5 wherein from about 0.5 to about 300 mg. of 7(S)-chloro-7-deoxy-lincomycin per kg. of host body weight is orally administered daily in association with a pharmaceutical carrier.

9. A process for treating malaria comprising the administration of an effective amount of the 1'-N-demethyl analog of 7(S)-chloro-7-deoxy-lincomycin to a mammal hosting a malarial parasite.

10. The process of claim 9 wherein from about 0.5 to about 300 mg. of the 1'-N-demethyl analog of 7(S)-chloro-7-deoxy-lincomycin per kg. of host body weight is administered daily in association with a pharmaceutical carrier.

11. The process of claim 9 wherein from about 0.05 to about 200 mg. of the 1'-N-demethyl analog of 7(S)-chloro-7-deoxy-lincomycin per kg. of host body weight is parenterally administered daily in association with a sterile pharmaceutical carrier.

12. The process of claim 9 wherein from about 0.5 to about 300 mg. of the 1'-N-demethyl analog of 7(S)-chloro-7-deoxy-lincomycin per kg. of host body weight is orally administered daily in association with a pharmaceutical carrier.

13. The process for treating malaria comprising the administration of an effective amount of the 4'-pentyl-1'-N-demethyl analog of 7(S)-chloro-7deoxy-lincomycin to a mammal hosting a malarial parasite.

14. The process of claim 13 wherein from about 0.5 to about 300 mg. of the 4'-pentyl-1'-N-demehyl analog of 7(S)-chloro-7-deoxy-lincomycin per kg. of host body weight is administered daily in association with a pharmaceutical carrier.

15. The process of claim 13 wherein from about 0.5 to about 200 mg. of the 4'-pentyl-1'-N-demethyl analog of 7(S)-chloro-7-deoxy-lincomycin per kg. of host body weight is parenterally administered daily in association with a sterile pharmaceutical carrier.

16. The process of claim 13 wherein from about 0.5 to about 300 mg. of the 4'-pentyl-1'-demethyl analog of 7(S)-chloro-7-deoxy-lincomycin per kg. of host body weight is orally administered daily in association with a pharmaceutical carrier.